United States Patent
Kelly

(10) Patent No.: US 7,282,681 B2
(45) Date of Patent: *Oct. 16, 2007

(54) MICROWAVE FABRICATION OF AIRFOIL TIPS

(75) Inventor: Thomas Joseph Kelly, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 71 days.

This patent is subject to a terminal disclaimer.

(21) Appl. No.: 10/908,293

(22) Filed: May 5, 2005

(65) Prior Publication Data

US 2006/0289496 A1 Dec. 28, 2006

(51) Int. Cl.
*H05B 6/64* (2006.01)
*B64C 1/00* (2006.01)

(52) U.S. Cl. .................................. 219/679; 244/123.1

(58) Field of Classification Search ................ 219/679, 219/601, 680; 244/125, 123.1, 126; 420/8, 420/10; 416/97 R; *B64C 1/00*
See application file for complete search history.

(56) References Cited

U.S. PATENT DOCUMENTS

| | | | | |
|---|---|---|---|---|
| 4,060,212 A | * | 11/1977 | Magenheim | 244/134 D |
| 4,422,229 A | * | 12/1983 | Sadler et al. | 29/889.721 |
| 4,587,700 A | | 5/1986 | Curbishley et al. | |
| 4,726,104 A | * | 2/1988 | Foster et al. | 29/889.1 |
| 5,340,530 A | | 8/1994 | Coulon | |
| 5,615,849 A | * | 4/1997 | Salisbury | 244/134 R |
| 6,207,940 B1 | * | 3/2001 | Feher et al. | 219/679 |
| 6,805,835 B2 | | 10/2004 | Roy et al. | |
| 2003/0012677 A1 | | 1/2003 | Senini | |
| 2003/0062660 A1 | | 4/2003 | Beard et al. | |

FOREIGN PATENT DOCUMENTS

| | | |
|---|---|---|
| EP | 0401187 | 5/1990 |
| WO | 2005/030417 | 7/2005 |

OTHER PUBLICATIONS

Anklekar, R.M., et al., "Microwave sintering and mechanical properties of PM copper steel"; Powder Metallurgy; 2001; pp. 355-362; vol. 44 No. 4; Maney Publishing.

Agrawal, D., et al.; "Metal parts from microwaves"; Materials World, The Institute of Materials; Nov. 1999; pp. 672-673; vol. 7, No. 11; London, Great Britain.

* cited by examiner

*Primary Examiner*—Daniel Robinson
(74) *Attorney, Agent, or Firm*—Adams Evans P.A.; Janice Whitlow

(57) ABSTRACT

A method of producing a metallic component includes: providing a body made of a first alloy; providing a preform comprising a metallic powder made of a second alloy and formed in the shape of an extension of the body; and heating the preform with microwave energy to sinter the metallic powder together and to bond the preform to the body. The method may be used to make new components as well as to repair or modify existing components.

9 Claims, 4 Drawing Sheets

MICROWAVE FABRICATION OF AIRFOIL TIPS

BACKGROUND OF THE INVENTION

This invention relates generally to high-temperature components for gas turbine engines and more particularly to turbine airfoils.

Thermal and mechanical loads applied to the leading and trailing edges and tips of a gas turbine engine airfoil can adversely affect the airfoil's useful life. Airfoils in gas turbine engines experience durability problems at the tip of the airfoil in the form of cracking due to thermally induced stress and material loss due to oxidation and rubbing. This can be addressed by using an alloy having increased resistance to environmental oxidation and corrosion. However, it is undesirable to upgrade the entire airfoil to a more thermal-resistant and oxidation-resistant alloy because this increases component cost and perhaps weight.

Materials having better high temperature properties than conventional superalloys are available. However, their increased density and cost relative to conventional superalloys discourages their use for the manufacture of complete gas turbine components, so they are typically used as coatings or as small portions of components. These highly environmentally resistant materials have proven difficult to attach to the basic airfoil alloys due to a mismatch in liquidus and solidus temperatures between the environmentally resistant alloys (higher liquidus and solidus) and the component alloys (lower liquidus and solidus). This mismatch is great enough that by the time the solidus of the environmentally resistant alloy is reached the liquidus temperature of the component alloy is far exceeded resulting in a melt away of the component. In processes to date that do join the blade alloy to the tip alloy a distinct centerline is formed in the joint. Experience predicts that this type of joint is likely to fail in either fatigue or rupture.

Accordingly, there is a need for a method of attaching environmentally resistant alloys to conventional superalloys.

BRIEF SUMMARY OF THE INVENTION

The above-mentioned need is met by the present invention, which according to one aspect provides a method of producing a metallic component, including: providing a body made of a first alloy; providing a preform including a metallic powder of a second alloy formed in the shape of an extension of the body; and heating the preform with microwave energy to sinter the metal powder together to bond the preform to the body.

According to another aspect of the invention, a method of producing an airfoil includes: providing an airfoil body made of a first alloy and having curved pressure and suction sides, a tip cap disposed between the pressure and suction sides at a radially outer end of the airfoil body and a partial height squealer tip extending radially outwards from the tip cap; providing a preform including a metallic powder of a second alloy different from the first alloy and formed in the shape of an extension of the squealer tip; positioning the preform on the squealer tip; and heating the preform with microwave energy to sinter the metal powder together in a consolidated squealer tip extension, and to bond the squealer tip extension to the body.

According to another aspect of the invention, a method of modifying an airfoil includes: providing an airfoil body made of a first alloy and having curved pressure and suction sides, a tip cap disposed between the pressure and suction sides at a radially outer end of the airfoil body, and a squealer tip extending radially outwards from the tip cap; removing a portion of the squealer tip so as to reduce its height in a radial direction; providing a preform comprising a metallic powder of a second alloy different from the first alloy and formed in the shape of an extension of the squealer tip; disposing the preform on the squealer tip; and heating the preform with microwave energy to sinter the metallic powder together in a consolidated squealer tip extension, and to bond the squealer tip extension to the body.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
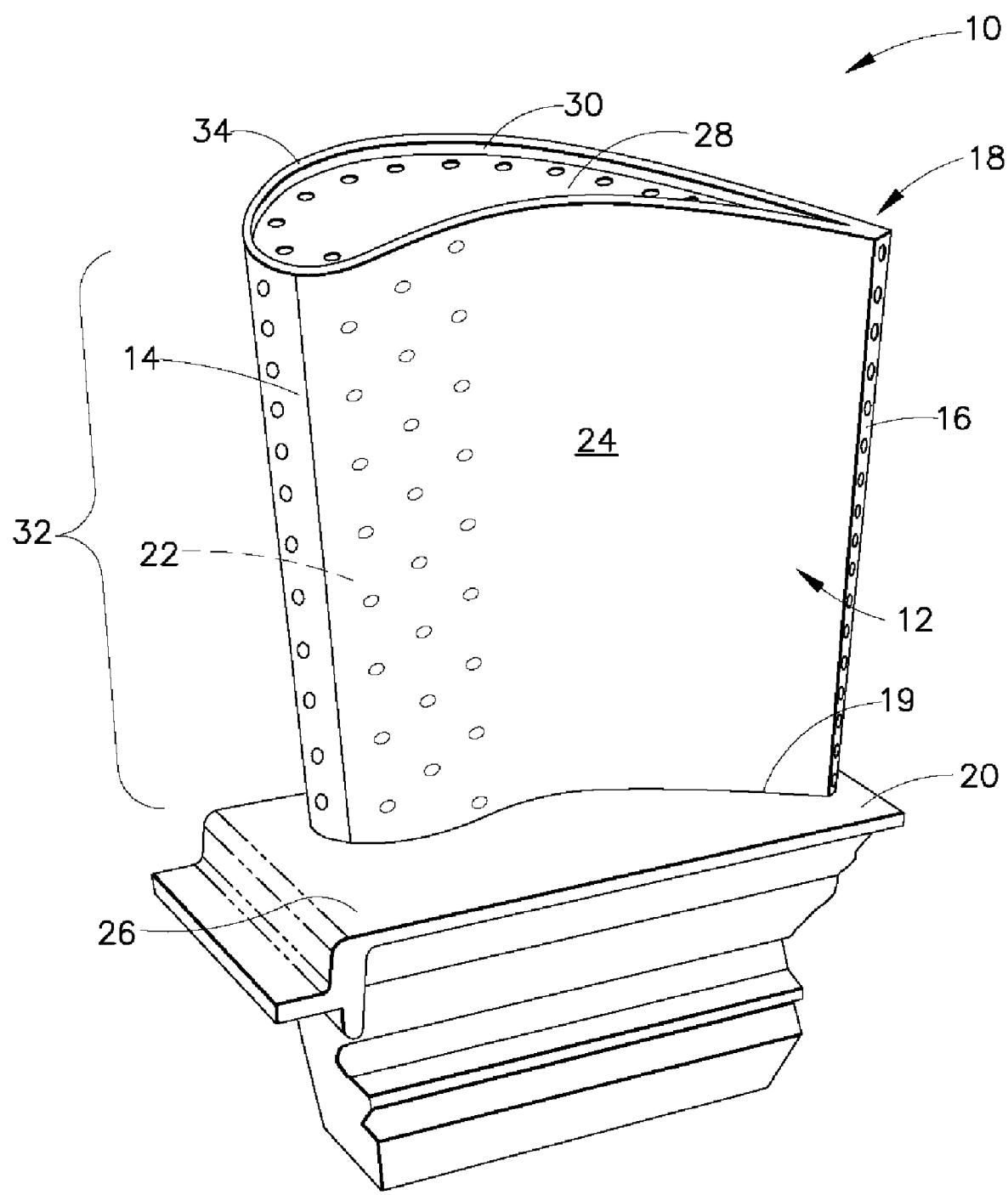
FIG. 1 is a perspective view of an exemplary prior art turbine blade.
Figure 2:
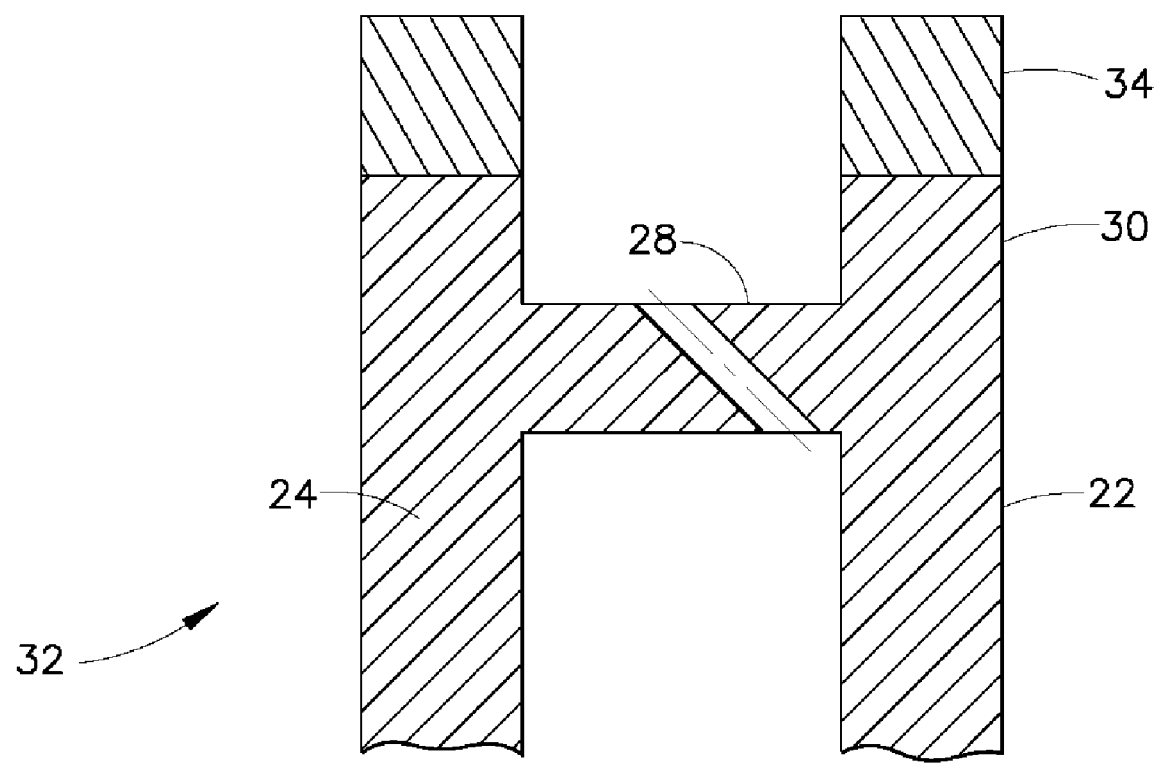
FIG. 2 is a cross-sectional view of a portion of the turbine blade of FIG. 1, showing a squealer tip thereof.

Referring to the drawings wherein identical reference numerals denote the same elements throughout the various views, FIG. 1 depicts an exemplary turbine blade 10 for a gas turbine engine. The present invention is equally applicable to the construction of other types of metallic components, such as stationary turbine vanes, frames, combustors, and the like. The turbine blade 10 comprises an airfoil 12 having a leading edge 14, a trailing edge 16, a tip 18, a platform 20, a convex suction sidewall 22, and a concave pressure sidewall 24. An arcuate inner platform 26 is attached to the platform 20 of the airfoil 12.

In manufacturing the airfoil 12, the pressure and suction sidewalls 24 and 22, a tip cap 28, and a partial height squealer tip 30 are integrally cast as a one-piece airfoil body 32. The airfoil body 32 is typically cast from known type of a nickel- or cobalt-based superalloy having high-temperature strength properties suitable for the intended operating conditions. Examples of known materials for constructing the airfoil body 32 include RENE 77, RENE 80, RENE 142, and RENE N4 and N5 nickel-based alloys.

A squealer tip extension 34 is bonded to the partial height squealer tip 30. The squealer tip extension 34 preferably comprises an alloy which exhibits superior high-temperature oxidation resistance compared to the base alloy of the airfoil body 32.

One example of a suitable material for this purpose is a rhodium-based alloy comprising from about three atomic percent to about nine atomic percent of at least one precipitation-strengthening metal selected from the group consisting of zirconium, niobium, tantalum, titanium, hafnium, and mixtures thereof; up to about four atomic percent of at least one solution-strengthening metal selected from the group consisting of molybdenum, tungsten, rhenium, and mixtures thereof; from about one atomic percent to about five atomic percent ruthenium; up to about ten atomic percent platinum; up to about ten atomic percent palladium; and the balance rhodium; the alloy further comprising a face-centered-cubic phase and an $L1_2$-structured phase.

Another suitable material for the squealer tip extension 34 is a second rhodium-based alloy comprising rhodium, platinum, and palladium, wherein the alloy comprises a microstructure that is essentially free of $L1_2$-structured phase at a temperature greater than about 1000° C. More particularly, the Pd is present in an amount ranging from about 1 atomic percent to about 41 atomic percent; the Pt is present in an amount that is dependent upon the amount of palladium, such that: a) for the amount of palladium ranging from about 1 atomic percent to about 14 atomic percent, the platinum is present up to about an amount defined by the formula (40+X) atomic percent, wherein X is the amount in atomic percent of the palladium; b) for the amount of palladium ranging from about 15 atomic percent up to about 41 atomic percent, the platinum is present in an amount up to about 54 atomic percent; and the balance comprises rhodium, wherein the rhodium is present in an amount of at least 24 atomic percent.

Unfortunately the mismatch between the melting points of the squealer tip extension 34 and the airfoil body 32 is great enough that by the time the solidus of the environmentally resistant alloy is reached the liquidus temperature of the airfoil body alloy is far exceeded resulting in a melt away of the airfoil body 32.

Figure 3:
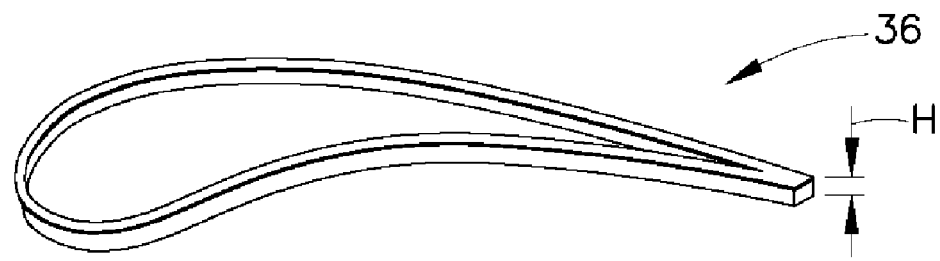
FIG. 3 is a perspective view of a preform for a squealer tip.

FIG. 3 depicts a preform 36 for a squealer tip extension for use with the present invention. The preform 36 substantially matches the peripheral shape of the partial height squealer tip 30, and has a radial height "H". The radial height H is selected to provide adequate protection for the airfoil body 32 from high-temperature oxidation, while minimizing the amount of material used. The radial height "H" may be a thin, foil-like dimension of about 0.127 mm (0.005 in.), or it may a more substantial thickness. In the illustrated example the radial height "H" is about 1.27 mm (0.050 in.)

The preform 36 may be constructed in various ways. For example, it may be prepared by a known powder metallurgy (PM) process in which a metallic powder is mixed with a lubricant and pressed into a die under high pressure. Alternatively, the preform 36 may be constructed through a metal injection molding (MIM) process in which a fine metallic powder is mixed with a plastic binder and extruded to a desired shape using plastic molding equipment. The resulting preform is chemically washed to remove a large portion of the plastic from the powder before subsequent sintering. Regardless of the process used to make the preform, the particle size of the metallic powder should be less than about 100 micrometers in diameter, to ensure compatibility with the microwave sintering process described below.

Figure 4:
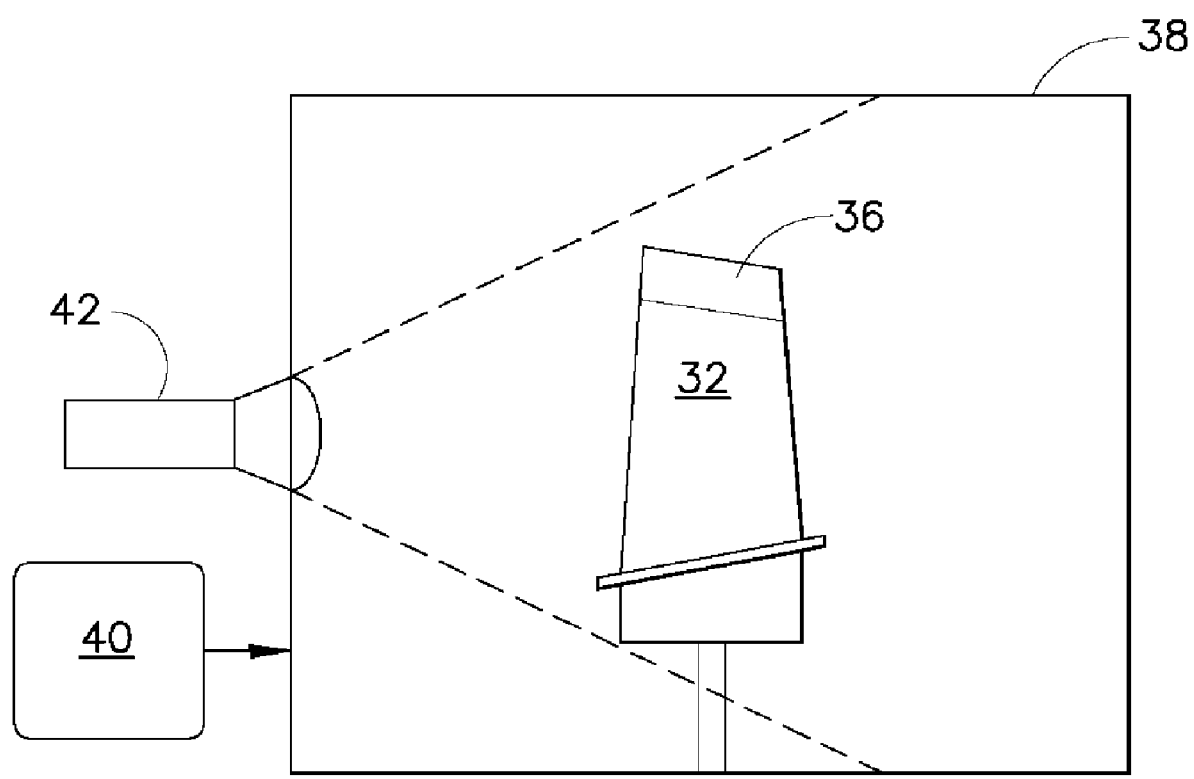
FIG. 4 is a schematic cross-sectional view of a preform inside a microwave chamber.

The process of attaching the preform 36 to the airfoil body 32 is depicted in FIG. 4. The preform 36 is placed on top of the partial height squealer tip 30. If necessary, a fixture may be used to temporarily retain the preform 36 in place. The airfoil body 32 is then placed in a chamber 38 which includes means for creating a suitable atmosphere to prevent undesired oxidation of the preform 36 or other reactions during the attachment process. In the illustrated example a supply 40 of inert gas such as argon is connected to the interior of the chamber 38. A microwave source 42 such as a known type of cavity magnetron with an output in the microwave frequency range is mounted in communication with the chamber 38. The microwave spectrum covers a range of about 1 GHz to 300 GHz. Within this spectrum, an output frequency of about 2.4 GHz is known to couple with and heat metallic particles without passing through solid metals.

The microwave source 42 is activated to irradiate the preform 48. In the illustrated example the microwave source 42 is depicted as having a direct line-of-sight to the entire preform 36. However, it is also possible to configure the chamber 38, which would typically be metallic, so that the preform 36 is heated by a combination of direct and reflected microwaves. Because of the small metallic particle size in the preform 36, the microwaves couple with the particles and heat them. The preform 36 is heated to a temperature below the liquidus temperature of the metallic powder and high enough to cause the metallic powder particles to fuse together and consolidate. The high temperature also melts and drives out any remaining binder. Since the microwave energy will not couple with the bulk material of the airfoil body 32, heating of the airfoil body 32 will occur solely through conduction through the preform 36. This will produce enough heat during the sintering process to cause the airfoil body 32 to braze itself to the preform 36 by way of capillary action.

The preform 36 is held at the desired temperature for a selected time period long enough to result in a consolidated squealer tip extension 34, and to bond the squealer tip extension 34 securely to the airfoil body 32. The heating rate (i.e. the output wattage of the microwave source) is selected depending on variables such as the mass of the preform 36, the shape of the chamber 38 and the and the desired cycle time of the sintering process.

When the sintering cycle is complete, the turbine blade 10 is removed from the chamber 38 and allowed to cool. If desired, the turbine blade 10 may be subjected to additional processes such as final machining, coating, inspection, etc. in a known manner.

Figure 5:
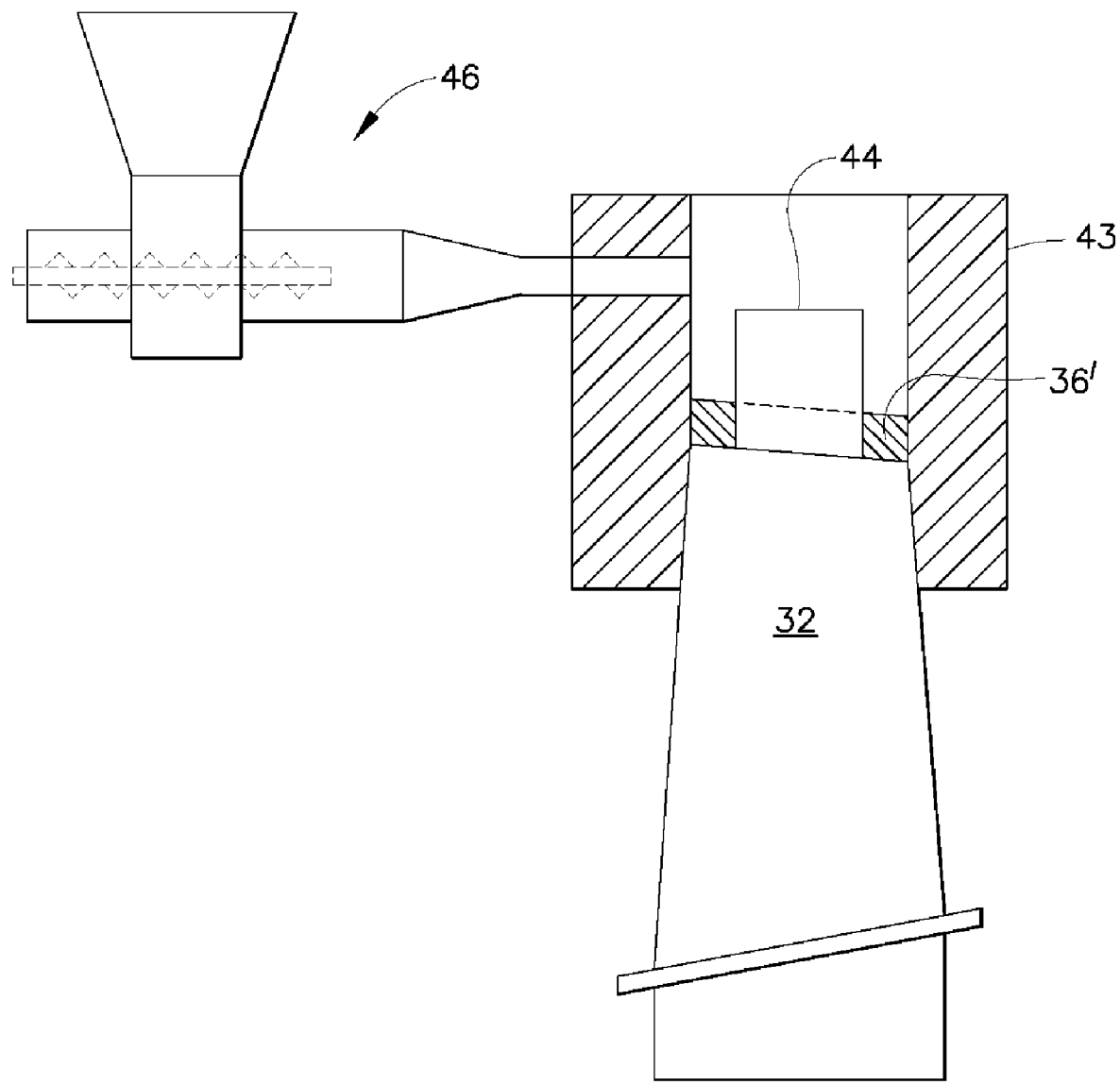
FIG. 5 is a schematic side view of an alternative process for attaching a squealer tip preform to an airfoil.

FIG. 5 illustrates an alternative method of creating a preform 36'. A mold or dam 43 is formed around the radially outer end of the airfoil body 32. A core 44 may be inserted into the dam 43 to define an inner perimeter. A preform 36' is then created through a metal injection molding (MIM) process using the extruding apparatus 46 shown. After the preform 36' is constructed in place, it is microwave sintered as described above to consolidate it and bond it to the airfoil body 32. If the dam 43 is constructed from a microwave-transparent material, then the preform 36' may be sintered without removing the dam 43.

Regardless of how the preform 36 is constructed, the airfoil body 32 and squealer tip extension 34 may be subjected to further consolidation using a known hot isostatic pressing ("HIP") process to ensure that the squealer tip extension is substantially 100% dense.

It should be noted that the above-described method of attachment of a squealer tip extension is equally applicable both to new make and to repair or modification of existing components. For example, a turbine airfoil having a conventional squealer tip extension 34 may be repaired or upgraded by removing the squealer tip extension, and then attaching a new squealer tip extension as described above.

The foregoing has described an airfoil tip manufacture or repair process. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A method of producing an airfoil, comprising:
providing an airfoil body made of a first alloy and having curved pressure and suction sides, a tip cap disposed between said pressure and suction sides at a radially outer end of said airfoil body and a partial height squealer tip extending radially outwards from said tip cap;
providing a preform comprising a metallic powder of a second alloy different from said first alloy and formed in the shape of an extension of said squealer tip;
positioning said preform on said squealer tip; and
heating said preform with microwave energy to sinter said metal powder together in a consolidated squealer tip extension, and to bond said squealer tip extension to said body.

2. The method of claim 1 wherein said preform is fabricated by:
providing a mixture of a metallic powder of a second alloy and a binder;
melting said binder and casting said mixture in a mold to form a preform; and
leaching said preform to remove excess binder.

3. The method of claim 1 wherein a majority of said binder is removed by washing said preform with a solvent selected to dissolve said binder but not said metallic powder.

4. The method of claim 1 wherein said preform is fabricated by:
providing a metallic powder of a second alloy; and
compacting said metallic powder into a mold under pressure to form a preform.

5. The method of claim 1 wherein said microwave heating is carried out with a cavity magnetron.

6. The method of claim 1 wherein said preform and said body are disposed in a chamber provided with a controlled composition atmosphere during said heating.

7. The method of claim 6 wherein said atmosphere is an inert gas.

8. The method of claim 1 wherein said metallic powder comprises a rhodium-based alloy.

9. The method of claim 1 wherein said preform is fabricated within a dam disposed around a radially outer end of said body.

* * * * *